(12) United States Patent
Agarwal et al.

(10) Patent No.: US 11,797,183 B1
(45) Date of Patent: Oct. 24, 2023

(54) HOST ASSISTED APPLICATION GROUPING FOR EFFICIENT UTILIZATION OF DEVICE RESOURCES

(71) Applicant: Western Digital Technologies, Inc., San Jose, CA (US)

(72) Inventors: Dinesh Kumar Agarwal, Bangalore (IN); Amit Sharma, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/850,787

(22) Filed: Jun. 27, 2022

(51) Int. Cl.
*G06F 3/06* (2006.01)

(52) U.S. Cl.
CPC .......... *G06F 3/0607* (2013.01); *G06F 3/0631* (2013.01); *G06F 3/0656* (2013.01); *G06F 3/0679* (2013.01)

(58) Field of Classification Search
CPC .... G06F 3/0607; G06F 3/0631; G06F 3/0656; G06F 3/0679
USPC .................................................. 711/154, 147
See application file for complete search history.

(56) References Cited

U.S. PATENT DOCUMENTS

| | | | |
|---|---|---|---|
| 2017/0249209 A1* | 8/2017 | Yang | G06F 3/0679 |
| 2021/0303181 A1* | 9/2021 | Wang | G06F 3/064 |
| 2022/0075545 A1* | 3/2022 | Agarwal | G06F 3/0659 |

* cited by examiner

Primary Examiner — Than Nguyen
(74) Attorney, Agent, or Firm — Chang & Hale LLP

(57) ABSTRACT

Systems and methods are disclosed for providing utilization of device resources based on host assisted grouping of applications. In certain embodiments, a data storage device includes a non-volatile memory, a volatile memory, and a controller configured to: receive application group information associated with applications from a host, wherein the application group information indicates corresponding application groups for the applications on the host; receive a plurality of write requests associated with a plurality of applications from the host, wherein the plurality of applications is included in the same application group; write data for each write request of the plurality of write requests in parallel across a plurality of channels associated with a plurality of dies in the non-volatile memory such that the data for the plurality of write requests share a parity buffer; and generate parity data for the data for the plurality of write requests.

20 Claims, 9 Drawing Sheets

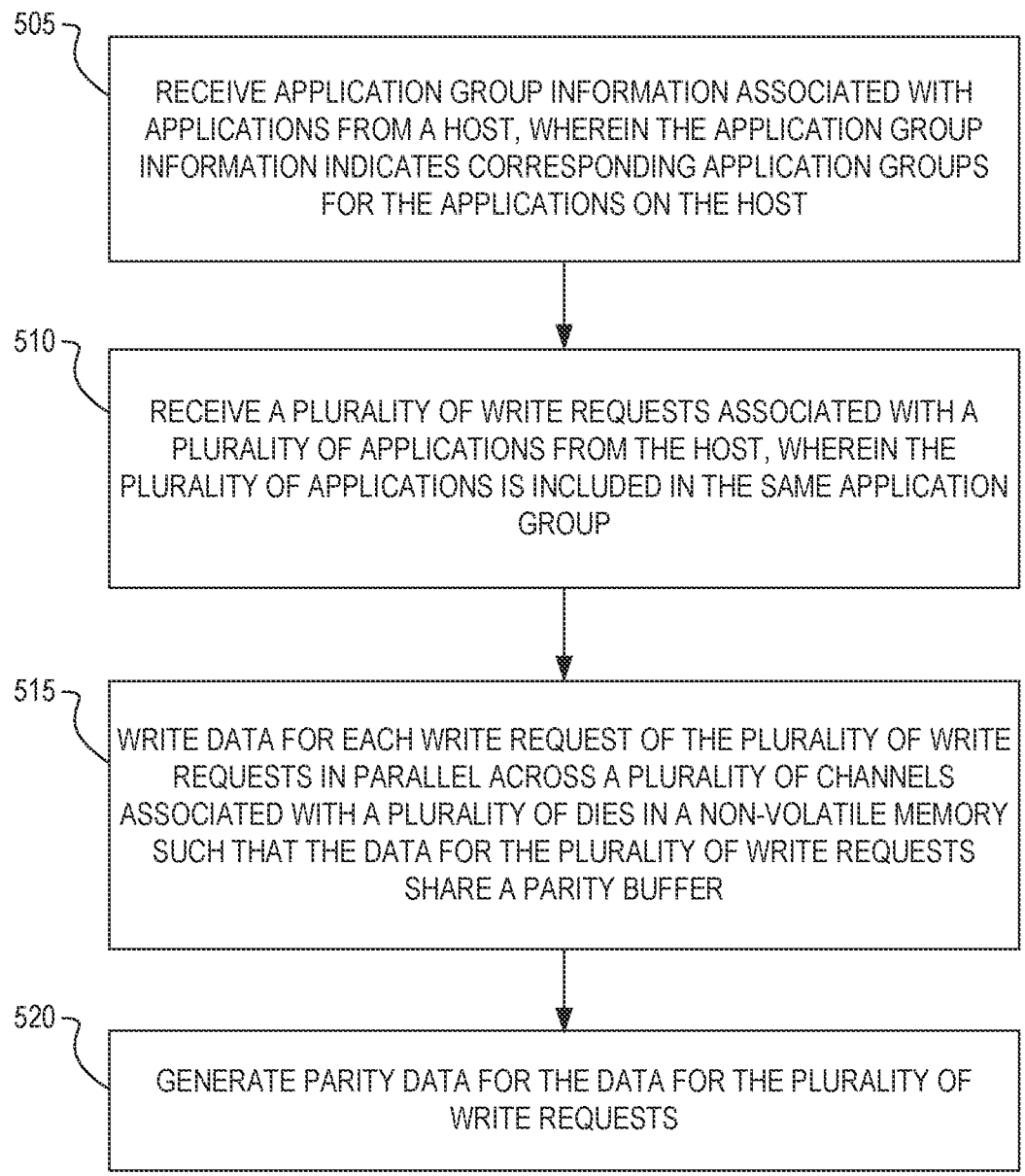

HOST ASSISTED APPLICATION GROUPING FOR EFFICIENT UTILIZATION OF DEVICE RESOURCES

BACKGROUND

Field

The present disclosure relates to data storage systems. In particular, the present disclosure relates to processing data requests from various host applications in data storage systems.

Description of Related Art

Hosts can run various applications and send read and write requests for the applications to data storage systems/devices. Different applications may have varying requirements and characteristics, and device resources may not be utilized among the different applications in an efficient manner.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 5 illustrates a workflow process for providing utilization of device resources based on host assisted application grouping in a data storage device, in accordance with one or more embodiments.

DETAILED DESCRIPTION

Figure 1:
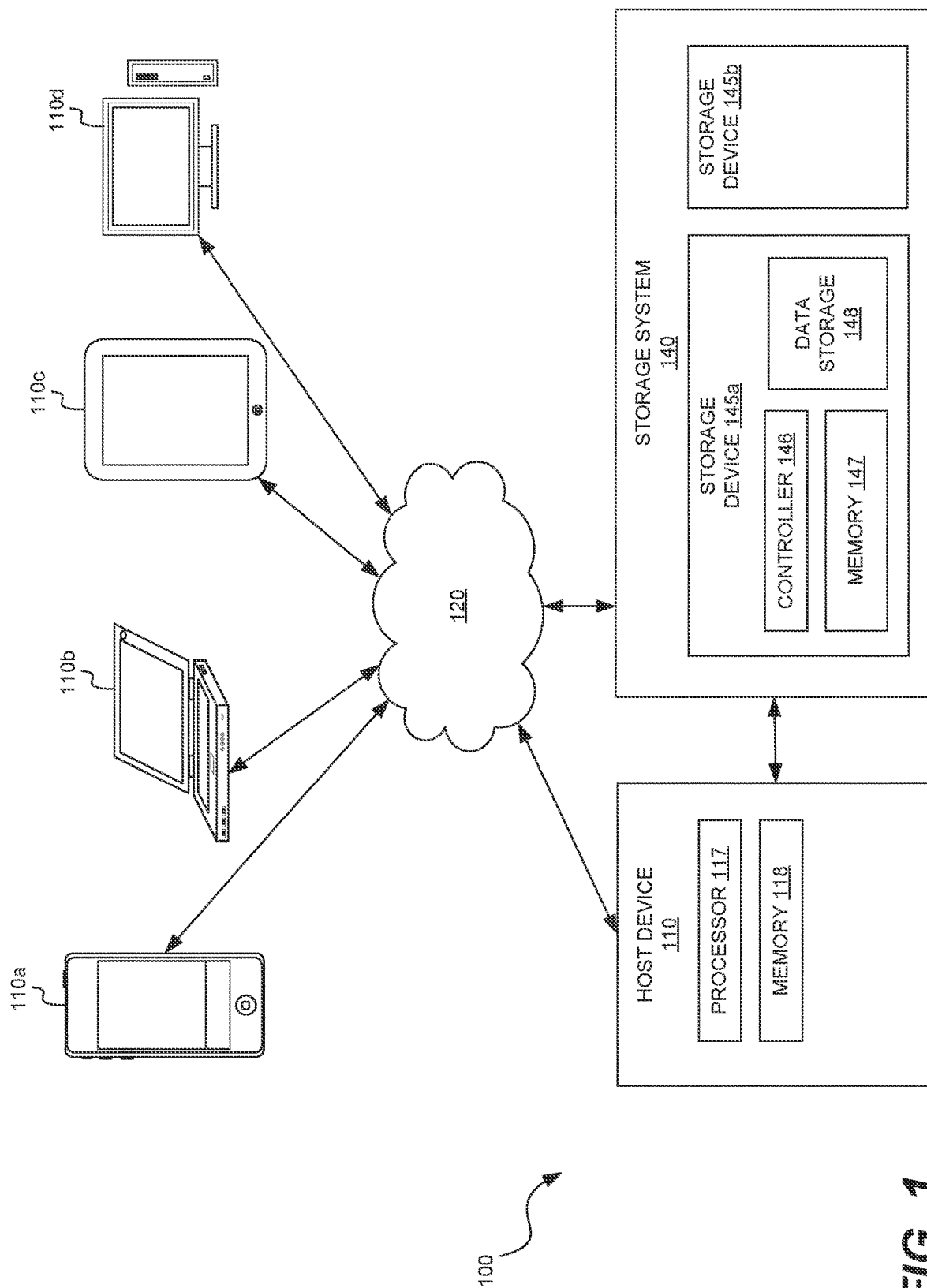
FIG. 1 illustrates an example system architecture for an example storage system relating to providing utilization of device resources based on host assisted application grouping, in accordance with one or more embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Storage Systems for Host Assisted Application Groupinq for Efficient Utilization of Device Resources A host may execute one or more applications that require data storage operations. For example, the host can send write requests or read requests for the one or more applications executing on the host to a storage system/device. The applications may have different requirements or characteristics, for example, in terms of latency, data rate, fragmentation, randomness of data, etc. However, device resources, such as parity buffers, cache, and SRAM, may be shared among applications that have different requirements or characteristics, which may result in inefficient utilization of device resources. In many cases, device resources are shared based on physical location of data for the applications or based on the way data is being written for the applications. As an example, parity data may be shared among applications having different requirements or characteristics that are writing across different channels, and parity data may frequently need to be loaded into and thrashed from cache since a limited amount of memory may be allocated for parity data. In addition, if applications having different data rates are sharing parity data, generation of parity data cannot be completed until the application having the slowest data rate is done writing data, which can also lead to inefficient use of parity buffers. Issues relating to inefficient utilization of device resources are described in more detail below.

In order to address these and other challenges, a storage system/device according to certain aspects can implement utilization of device resources based on host application grouping. The host can group applications running on the host into one or more application groups based on requirements or characteristics. For instance, applications that have a high correlation based on the requirements or characteristics can be grouped together. Examples of such requirements or characteristics can include latency, data rate, fragmentation, randomness of data, etc. Each group of applications may be assigned a group identifier (ID). The group ID can be communicated to the storage device, and the storage device can utilize device resources based on the group ID such that the resources are shared among the applications belonging to the same group ID. Examples of device resources can include cache, DRAM, SRAM, parity buffers, etc. As an example, parity can be shared by applications in the same group ID, which have similar requirements or characteristics. Because parity data is generated for applications having similar requirements or characteristics, parity data may not need to be loaded into and thrashed from cache as frequently compared to applications having different requirements or characteristics. Accordingly, efficiency can be increased in generating and using parity data. By allocating and sharing device resources based on similar applications, the storage system described herein can reduce latencies, reduce write amplification, and increase performance. Details relating to the storage system for providing host assisted application grouping for utilization of device resources are provided below.

FIG. 1 illustrates an example system architecture 100 for an example storage system 140 relating to providing utilization of device resources based on host assisted application grouping, in accordance with one or more embodiments. The architecture 100 can include one or more user or client computing devices or hosts 110. A client computing device or host 110 can include a processor 117 and a memory 118. The one or more client computing devices 110 may be coupled to the storage system 140 directly or via a network 120. Types of client computing devices 110 that may access the storage system 140 can include phones 110a, such as smartphones, laptop computers 110b, tablet computers 110c, desktop computers 110d, wearable computers and/or other network-connected computing devices. The network 120 may be a local area network (LAN), a wide area network (WAN) (e.g., the Internet), or other type of computer network, and the connections between the various client components of the architecture 100 and the network 120 may be either wired or wireless.

The architecture 100 can also include the storage system 140 for providing utilization of device resources based on host assisted application grouping. The storage system 140 can include one or more storage devices 145. A storage device 145a can include a controller 146, a memory 147, and data storage 148 (e.g., non-volatile memory). A storage device 145b can also include similar components. The storage system 140 may store data and/or data objects that may be accessed by the client computing devices 110. The storage system 140 may include multiple storage devices 145 (e.g., multiple storage drives such as hard disk drives (HDDs), solid state drives (SSDs), etc.). A storage device 145 may comprise magnetic media (e.g., magnetic discs, shingled magnetic recording (SMR) media/discs, etc.) and/or solid-state media.

While certain embodiments are described herein, it should be understood that different types of storage devices and random-access memory (RAM) technology can be used in the above embodiments. For example, the RAM could comprise any of Static RAM (SRAM), Dynamic RAM (DRAM), Synchronous Dynamic RAM (SDRAM), Single Data Rate Synchronous Dynamic RAM (SDR SDRAM), Double Data Rate Synchronous Dynamic RAM (e.g., DDR SDRAM, DDR2, DDR3, DDR4), Graphics Double Data Rate Synchronous Dynamic RAM (e.g., GDDR SDRAM, GDDR2, GDDR3, GDDR4, GDDR5), and/or flash memory. Non-volatile random-access memory could also be used, such as non-volatile dual in-line memory module (NVDIMM), NVDIMM-N, NVDIMM-P, and/or NVDIMM-F.

In addition, the storage devices can utilize hard disk drive (HDD) and/or different types of non-volatile memory such as NAND and its variations like SLC (Single Level Cell), eMLC (Enterprise Multi Level Cell), MLC (Multi Level Cell), TLC (Triple Level Cell), and QLC (Quadruple Level Cell). New types of emerging non-volatile memory could also be used such as Program in Place or Storage Class Memory (SCM) such as resistive random-access memory (ReRam), phase-change memory (PCM), and magnetoresistive random-access memory (MRAM).

In some embodiments, a "host" can refer to a system or device from which data on a storage system or device is accessed or requested. For instance, a client computing device 110 can be a host. In some embodiments, a "device" can refer to a storage system or device from which data is obtained, for example, to provide to a host.

According to certain embodiments, the storage system 140 and/or the storage device(s) 145 can be configured to provide utilization of device resources based on host assisted application grouping, as described herein. For illustrative purposes, providing host assisted application grouping for utilization of device resources is described in connection with a storage device 145. A host 110 can determine application groups for various applications available on the host 110, and the storage device 145 can share device resources among applications associated with the same application group. Various factors can be used to determine application groups. The factors may relate to requirements, characteristics, properties, etc. associated with applications. Examples of factors may include, but are not limited to, latency, fragmentation, randomness, data rate, access rate, workload, amount of data, etc. Many other factors can be used as appropriate. For instance, if the storage device 145 receives write requests associated with different applications, the storage device 145 can write data of applications belonging to the same application group across multiple channels for multiple dies such that parity buffer/data is shared by the applications. In this way, loading and thrashing of parity data to and from cache can be reduced. Sharing and utilization of device resources based on application groups can provide a number of advantages, including reducing write amplification, reducing latency, improving cache management, and improving performance. The techniques described herein can also apply to other types of device resources, data, and data operations. Details relating to providing utilization of device resources based on host assisted application grouping are described below, for example, in connection with FIGS. 2-6.

Figure 2:
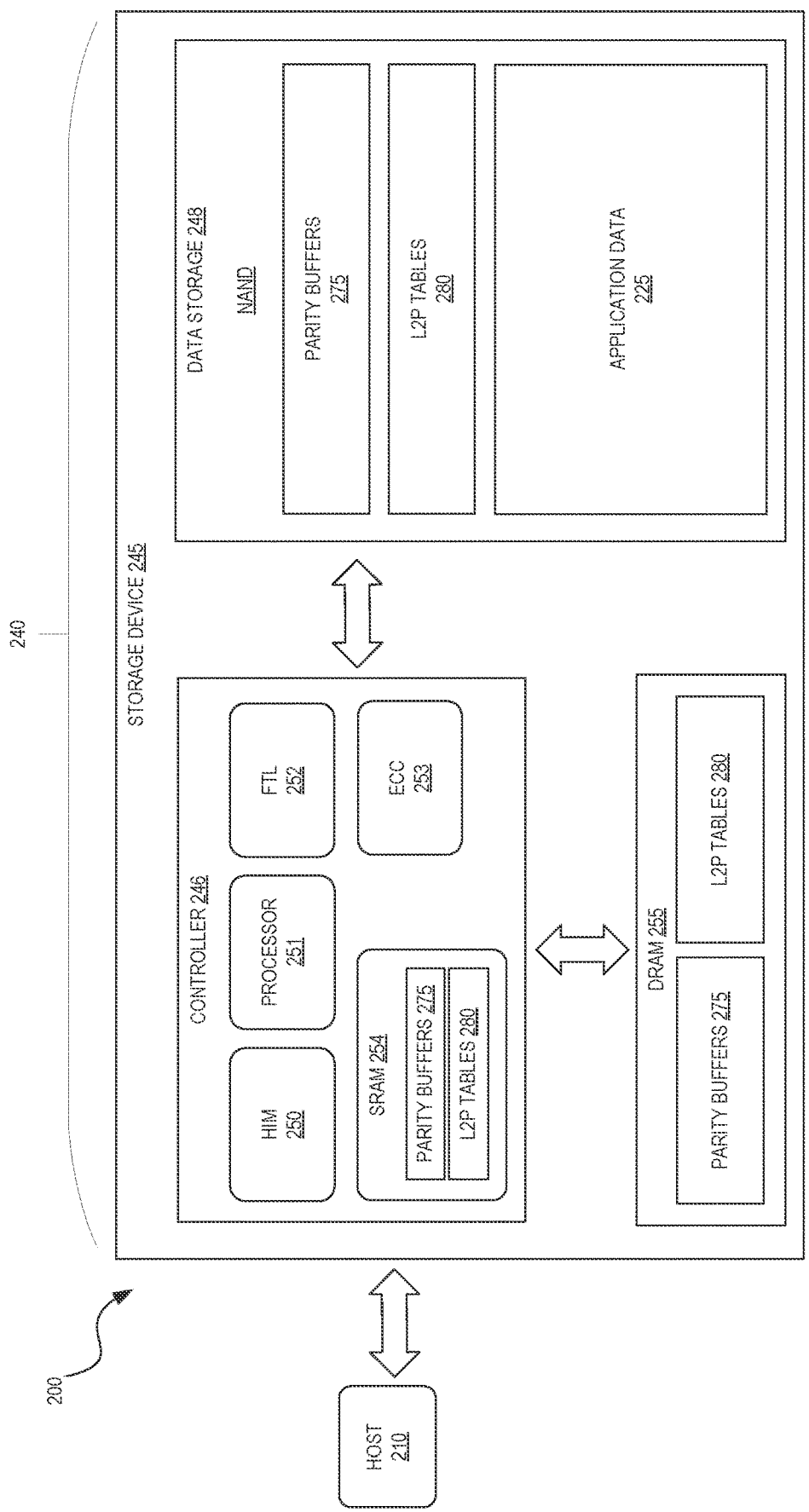
FIG. 2 is a block diagram illustrating an example storage device, in accordance with one or more embodiments.

FIG. 2 is a block diagram 200 illustrating an example storage device 245, in accordance with one or more embodiments. In some embodiments, components of FIG. 2 can be similar to components of FIG. 1 having similar names and/or reference numbers. For example, the storage device 245 can be similar to a storage device 145 in FIG. 1. Certain details relating to the block diagram 200 are described above in connection with FIG. 1.

The storage system 240 can include one or more storage devices 245. A storage device 245 can communicate with a host 210, such as a client computing device. The storage device 245 can include a controller 246 and data storage 248. As shown in FIG. 2, the storage device 245 is an SSD device and includes NAND array(s)/memory. The controller 246 can include various components. In some embodiments, the controller 246 includes a host interface manager (HIM) 250, a processor 251, a flash translation layer (FTL) 252, and an error correction code (ECC) engine 253. The HIM 250 can manage interfacing and communication between the host 210 and the storage device 245. Examples of the interface between the host 210 and the storage device 245 may include peripheral component interconnect express (PCIe), serial advanced technology attachment (SATA), non-volatile memory express (NVMe), etc. The HIM 250 can receive various data requests, such as read requests or write requests. The processor 251 can be configured to execute instructions related to processing data requests. The FTL 252 may handle translation of logical block addresses (LBAs) from the host 210 to physical addresses on the data storage 248 as well as garbage collection. The error correction code (ECC) engine can perform error correction for data, such as generating parity data. For instance, low-density parity-check (LDPC) can be used. In some cases, XOR schemes can be used to generate parity data. The storage device 245 can also include a controller memory, which can include memory that is internal or external to the controller 246. For example, the controller memory may include an SRAM 254. The controller memory may also include a DRAM 255. The controller memory can be used for various purposes and for storing various types of data. For instance, the controller memory can be allocated for a transfer RAM (TRAM), control data such as a logical-to-physical (L2P) table, etc. In FIG. 2, the NAND data storage 248 is shown to store parity buffers/parity data 275, L2P tables 280, and application data 225. A portion of the parity buffers 275 and/or a portion of the L2P tables 280 in the NAND storage 248 can be cached to the DRAM 255. A smaller portion of the parity buffers 275 and/or a smaller portion of the L2P tables 255 may be cached to the SRAM 254. For example, most frequently used portions of the parity buffers 275 and/or L2P tables 255 could be cached in the SRAM 254. The storage device 245 and/or the controller 246 may include additional or fewer components, depending on the embodiment.

Figure 3A:
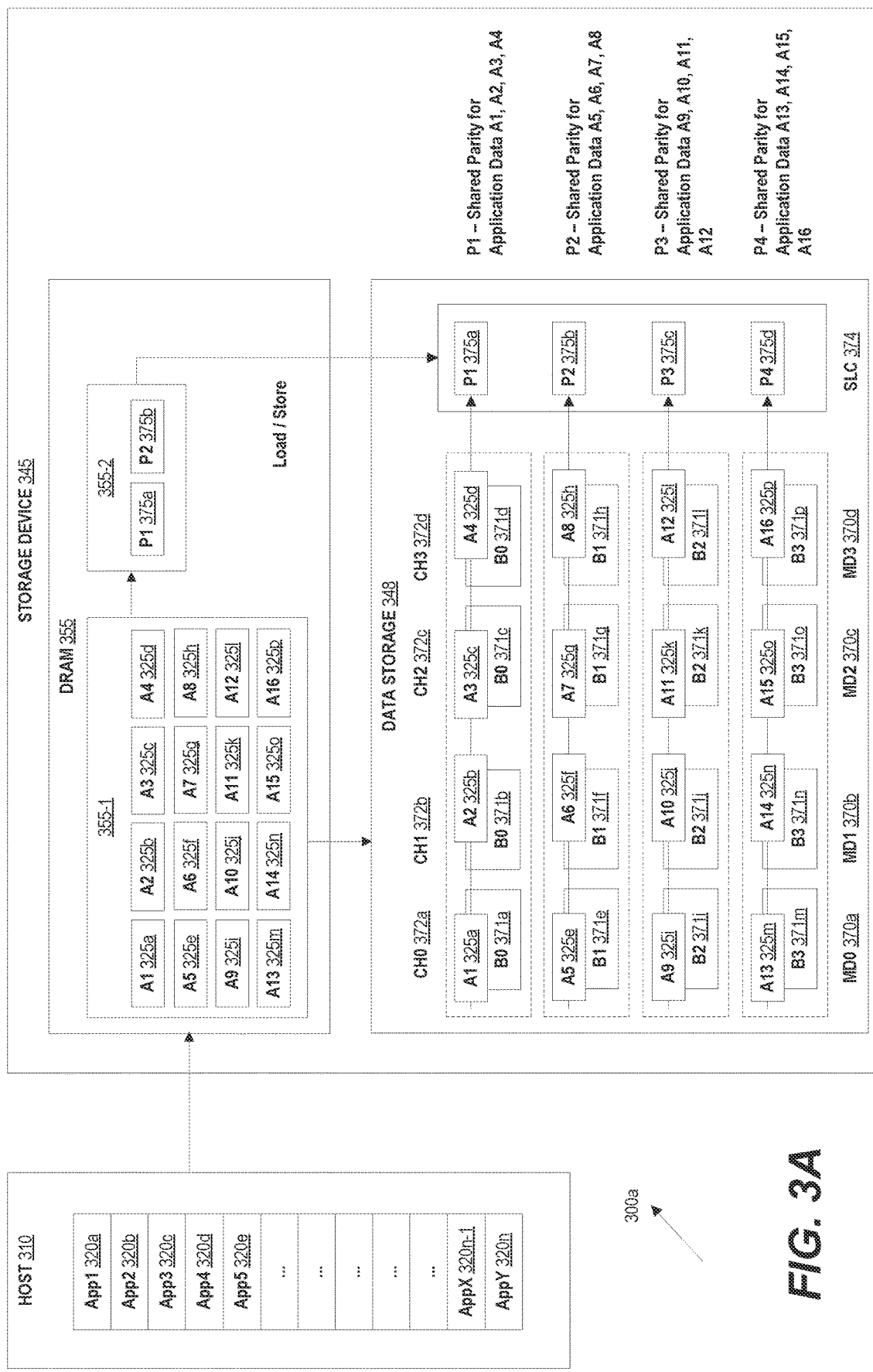
FIG. 3A is a block diagram illustrating utilization of device resources in an example storage device, in accordance with one or more embodiments.

FIG. 3A is a block diagram 300a illustrating utilization of device resources in an example storage device 345, in accordance with certain embodiments. In some embodiments, components of FIG. 3A can be similar to components of FIG. 1-2 having similar names and/or reference numbers. For example, the storage device 345 can be similar to the storage device 145, 245 in FIGS. 1-2. Certain details relating to the block diagram 300a are described above in connection with FIG. 1-2.

A host 310 may execute more one or more applications 320, which may request data storage operations in connection with the storage device 345. In the example of FIG. 3A, the one or more applications 320 executing on the host 310 include App1 320a, App2 320b, App3 320c, . . . AppX 320n-1, AppY 320n, etc. The applications 320 can have respective requirements, characteristics, or properties. For example, the requirements, characteristics, and/or properties can relate to latency, fragmentation, randomness of data, data rate, etc. Each application 320 can read data from or write data to the storage device 345. The host 310 can send read and write requests to the storage device 345 on behalf of the applications 320.

In connection with a write request, data of an application 320 can be cached in a DRAM 355 of the storage device 345 and written to data storage 348. For example, data for App1 320a is indicated as application data A1 325a, data for App2 320b is indicated as application data A2 325b, data for App3 320c is indicated as application data A3 325c, and so forth. Application data 325 may also be referred to as "app data." The application data 325 is stored in the DRAM 355 and written to the data storage 348. The storage device 345 may allocate a portion or section 355-1 of the DRAM 355 for caching the application data 325. The storage device 345 may also allocate a portion or section 355-2 of the DRAM 355 for caching parity data/buffers 375. The DRAM sections 355-1, 355-2 may be referred to as the DRAM buffers/caches 355-1, 355-2. In the example of FIG. 3A, the storage device 345 is an SSD device, and the data storage 348 includes NAND arrays/memory. The data storage 348 may include one or more meta dies MD 370. Each meta die MD 370 can include one or more dies, which can include one or more blocks 371. For instance, a die can be made of multiple planes, blocks, pages, etc. Various device resources can be used or generated in writing the application data 325 to the data storage 348, such as cache, DRAM, SRAM, parity buffers, etc.

For illustrative purposes, a simplified example is shown in FIG. 3A. FIG. 3A shows 16 active applications 320 that are writing data to the storage device 345, 4 meta dies (16 dies) 370, and 4 parity buffers 375. The meta dies 370 include meta dies MD0 370a, MD1 370b, MD2 370c, and MD3 370d, and the parity buffers 375 include parity buffers P1 375a, P2 375b, P3 375c, and P4 375d. Each meta die ("MD") 370 includes 4 blocks 371. For instance, meta MD0 370a includes blocks B0 371a, B1 371e, B2 371i, and B3 371m. Meta die MD1 370b includes blocks B0 371b, B1 371f, B2 371j, and B3 371n, and so forth. Data can be written to the meta dies 370 through respective channels CH 372. For example, data can be written to meta die MD0 370a through channel CH0 372a, data can be written to meta die MD1 370b through channel CH1 372b, etc. Data can be written in parallel to the meta dies 370 using the different channels CH 372. For instance, the applications 320 and/or corresponding application data 325 are shown as belonging to different ranges, and a block or a set of blocks 371 can be allocated to the applications 320 and/or application data 325. The DRAM cache 355-2 can include an amount of memory for caching 2 parity buffers. If the DRAM cache 355-2 does not include sufficient memory for caching all the parity buffers needed for generating parity data, the parity buffers in the DRAM cache 355-2 may be written to the data storage 348 and reloaded to the DRAM cache 355-2 as needed. In some embodiments, the parity data may be written to an SLC, for example, for faster access and for preventing corruption of parity data. The example of FIG. 3A is provided for illustrative purposes and simplicity, and in general, the number of dies, blocks, and/or parity buffers will be much higher.

In general, device resources, such as cache, DRAM, SRAM, parity buffers, etc., can be shared among different applications 320 based on physical location(s) of application data 325 or the way in which or when application data 325 is being written. For example, application data A1-A4 325a-d for applications App1-App4 320a-d can be put across different channels CH0-CH3 372a-d and share parity buffer P1 375a. Similarly, application data A5-A8 325e-h for applications App5-App8 320e-h can be put across channels CH0-CH3 372a-d and share parity buffer P2 375b, and so forth. However, the applications 320 sharing parity buffers 375 may not have a high correlation or may not be similar in terms of requirements, characteristics, or properties. If the host 310 starts writing application data A1 325a, A5 325e, A9 325i, A13 326m, A2 325b, A6 325f, A11 325k, and A16 325p, the storage device 345 will need to access all parity buffers P1-P4 375a-d to generate parity data. Because the DRAM cache 355-2 only has enough memory to include 2 parity buffers, parity data loading and thrashing can occur frequently, leading to inefficiency. Since in most cases, the number of active applications, dies, blocks, and/or parity buffers can be much higher, the continuous loading and thrashing of parity data may increase write amplification and inefficiency to a greater extent.

In addition, the applications 320 sharing parity buffers 375 may be writing application data 325 at different rates, and generation of parity would depend on the application 320 with the slowest rate. This can result in parity data being continuously required in the DRAM cache 355-2 and can also lead to inefficient usage of DRAM cache 355-2. The foregoing issues can also apply to allocation and utilization of other device resources, such as SRAM or cache. The foregoing issues may also apply to other types of data, such as control data, L2P data, etc.

Figure 3B:
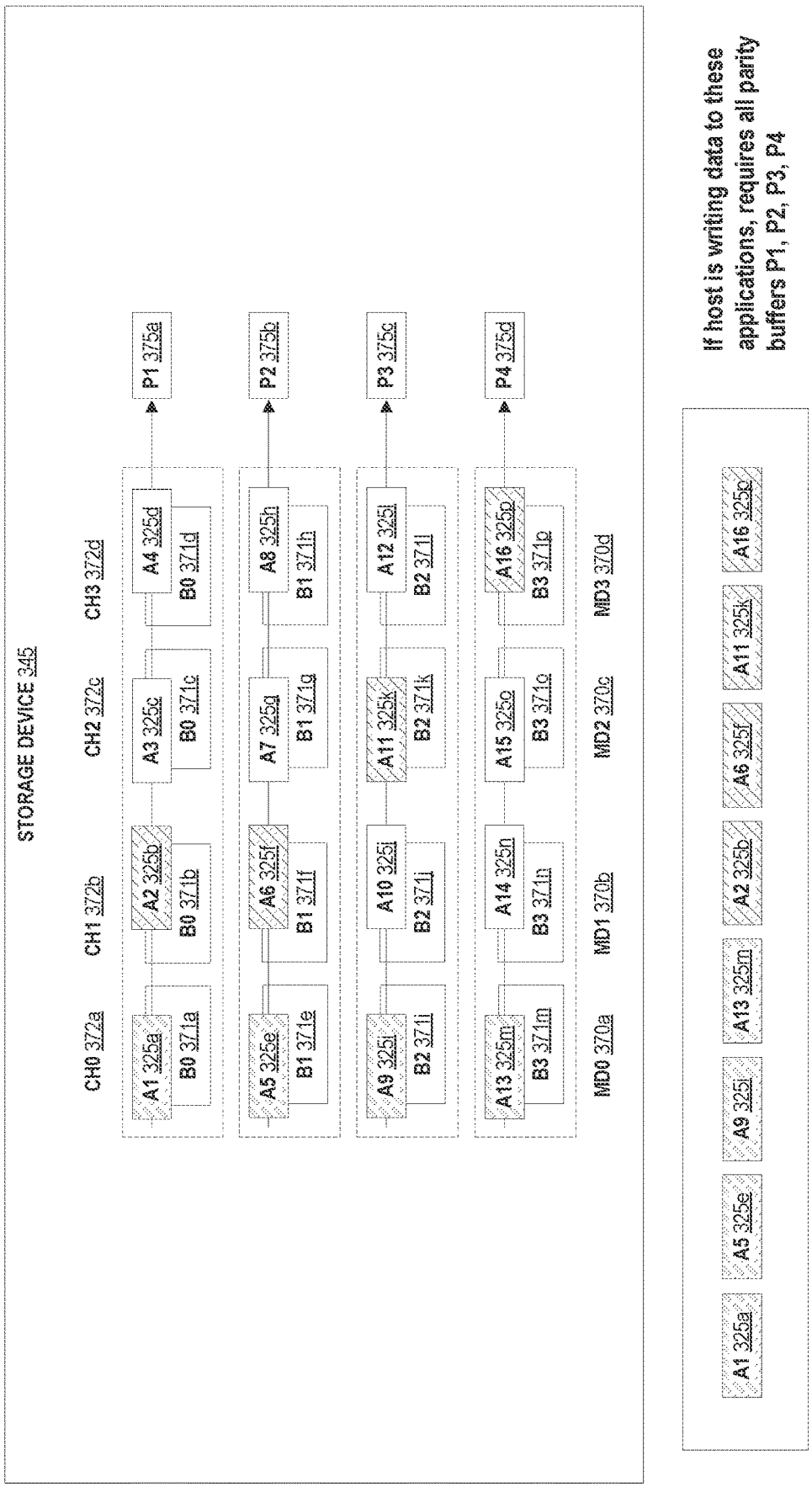
FIG. 3B is a block diagram illustrating utilization of device resources in an example storage device, in accordance with one or more embodiments.

FIG. 3B is a block diagram 300b illustrating utilization of device resources in an example storage device 345, in accordance with certain embodiments. In some embodiments, components of FIG. 3B can be similar to components of FIGS. 1-3A having similar names and/or reference numbers. For example, the storage device 345 can be similar to the storage device 145, 245, 345 in FIGS. 1-2, 3A. Certain details relating to the block diagram 300b are described above in connection with FIGS. 1-3A.

FIG. 3B further illustrates the example of FIG. 3A for writing application data 325 for certain applications 320. In the example of FIG. 3B, the host 310 is sending write requests for applications App1 320a, App5 320e, App9 320i, App13 320m, App2 320b, App6 320f, App11 320k, and App16 320p. App1 320a, App5 320e, App9 320i, and App13 320m may have a high correlation in terms of requirements, characteristics, or properties, and corresponding application data A1 325a, A5 325e, A9 325i, and A13 325m are indicated in a first pattern. App2 320b, App6 320f, App11 320k, and App16 320p may have a high correlation in terms of requirements or characteristics, and corresponding application data A2 325b, A6 325f, A11 325k, and A16 325p are indicated in a second pattern. Because similar applications are not sharing parity data, all parity buffers P1 375a, P2 375b, P3 375c, and P4 375d are required, and the parity buffers P1-P4 375a-d may continuously be loaded and unloaded between the DRAM cache 355-2 and the data storage 348, leading to increased write amplification and inefficiency.

Figure 4A:
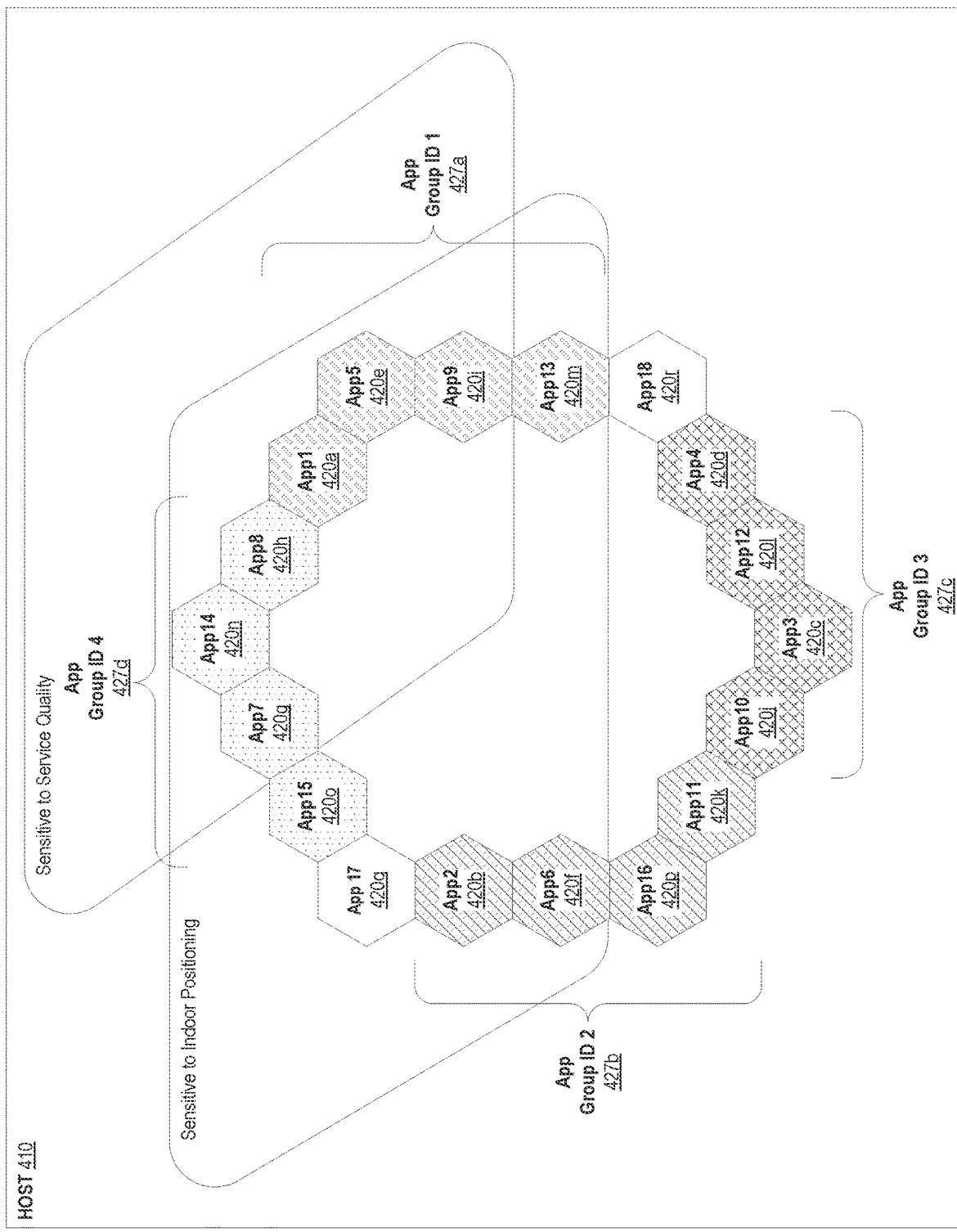
FIG. 4A is a block diagram illustrating host assisted grouping of applications in an example data storage device, in accordance with certain embodiments.

FIG. 4A is a block diagram 400a illustrating host assisted grouping of applications in an example data storage device, in accordance with certain embodiments. In some embodiments, components of FIG. 4A can be similar to components of FIGS. 1-3B having similar names and/or reference numbers. For example, the host 410 can be similar to the host 110, 210, 310 in FIGS. 1-3B in some aspects. Certain details relating to the block diagram 400a are described above in connection with FIGS. 1-3B.

A host 410 can determine one or more application groups for various applications 420 executing on the host 410. For instance, the applications 420 can be similar to applications 320 in FIG. 3A. The host 410 determines application groups 427 based on various factors, such as requirements, characteristics, or properties relating to the applications 420. An application group 427 may also be referred to as an "app group." In the example of FIG. 4A, 18 applications 420 are available on the host 410. The host 410 has determined 4 application groups 427 and assigned application group identifiers (IDs) to the application groups 427. A first application group 427a is assigned App Group ID 1 and includes App1 420a, App5 420e, App9 420i, and App13 420m. A second application group 427b is assigned App Group ID 2 and includes App2 420b, App6 420f, App11 420k, and App16 420p. A third application group 427c is assigned App Group ID 3 and includes App3 420c, App10 420j, App4 420d, and App12 4201. A fourth application group 427d is assigned App Group ID 4 and includes App7 420g, App14 420n, App15 4200, and App8 420h. In the example of FIG. 4A, applications 420 that belong to the same application group 427 are indicated in the same pattern. App17 420g and App18 420r are not shown to be included in an application group 427. They may be assigned to existing application groups 427 or may be assigned to additional application groups 427 that are created at a later time. In some embodiments, application groups 427 for applications 420 may be changed or adjusted periodically such that the applications 420 are assigned to appropriate application groups 427. In the example of FIG. 4A, each application group 427 is shown to include 4 applications 420, but an application group 427 can include any number of applications 420, and the number of applications 420 in different application groups 427 can vary.

Various factors may be used to determine application groups 427, such as requirements, characteristics, or properties relating to applications 420. Applications 420 belonging to the same application group 427 can have a high correlation or can be similar to each other based on one or more selected requirements, characteristics, or properties. Examples of requirements, characteristics, or properties relating to applications 420 may include latency, fragmentation, data randomness, data rate, access rate, workload, amount of data, etc.

According to certain aspects, latency can indicate a response time that is expected or required by an application 420. In some cases, latency may be specified in microseconds (μs). For example, time-critical or time-sensitive applications 420 may specify latency in microseconds. In other cases, latency may be specified in milliseconds (ms). If a first application 420 requires lower latency (e.g., a shorter response time) than a second application 420, a request for the first application 420 may be processed prior to a request for the second application 420. In some cases, this can enable the parity buffer for the first application 420 to remain in the DRAM cache for a longer period of time. Applications 420 having similar latency requirements may be grouped in the same application group 427.

According to certain aspects, fragmentation can refer to fragmentation of application data in a storage device. For instance, some of data of an application 420 in the storage device may become fragmented over time. In some cases, if an application 420 writes small amounts of data frequently, application data stored in the storage device may tend to be more fragmented. According to certain aspects, randomness of data can refer to whether data of an application is random or sequential. As an example, if a movie file is being written to the storage device, data for the movie file will generally be sequential. Other types of data may tend to be more random and not sequential. In some cases, fragmentation and randomness can be related. Applications 420 having similar patterns with respect to data fragmentation and/or randomness may be grouped together in the same application group 427.

According to certain aspects, data rate can refer to a rate at which data is written or read by an application 420. Applications 420 can have different data rates. For instance, a first application 420 may write data at a rate of 300 pages per minute, and a second application 420 may write data at a rate of 10 pages per minute. If the first application 420 and the second application 420 share parity data, generation of parity data may not be completed until the second application 420 completes writing its data. Accordingly, it would be more efficient to group applications 420 having similar data rates in the same application group 427. Data rates may differ for reading and writing data.

According to certain aspects, access rate or frequency can refer to how often an application 420 is accessed or used. Some applications 420 may be used more frequently than other applications 420. For instance, a navigation application 420 may be used more frequently than an emergency service application 420. Applications 420 having similar access rates may be grouped together in the same application group 427. According to certain aspects, workload or amount of data can refer to how much data is generally written, for example, at one time. Applications 420 having similar workload or amount of data may be grouped together in the same application group 427.

Requirements, characteristics, or properties associated with applications 420 described above are provided as examples, and any other factors may be used as appropriate, and many variations are possible. Examples of applications 420 can include, but are not limited to navigation application, traffic information application, weather application, travel information application, recommendation application, gaming application, social network application, shopping application, messaging application, email application, entertainment application, media streaming application, medical service application, health service application, emergency service application, etc. Applications 420 may differ in access frequency, data requirements, etc. In certain cases, some applications 420 may be sensitive to service quality and/or indoor positioning.

Figure 4B:
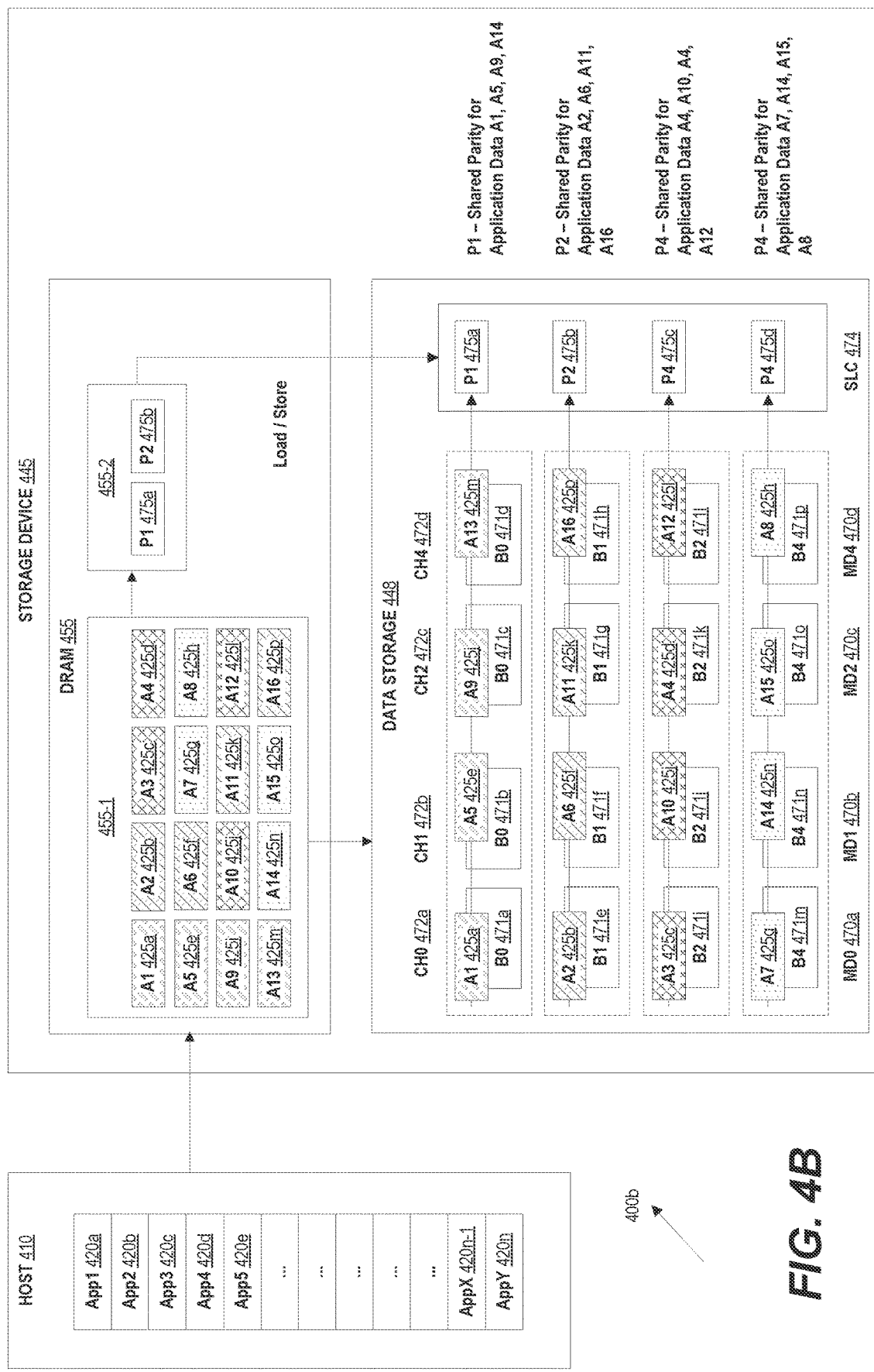
FIG. 4B is a block diagram illustrating utilization of device resources based on host assisted grouping of applications in an example data storage device, in accordance with certain embodiments.
Figure 4C:
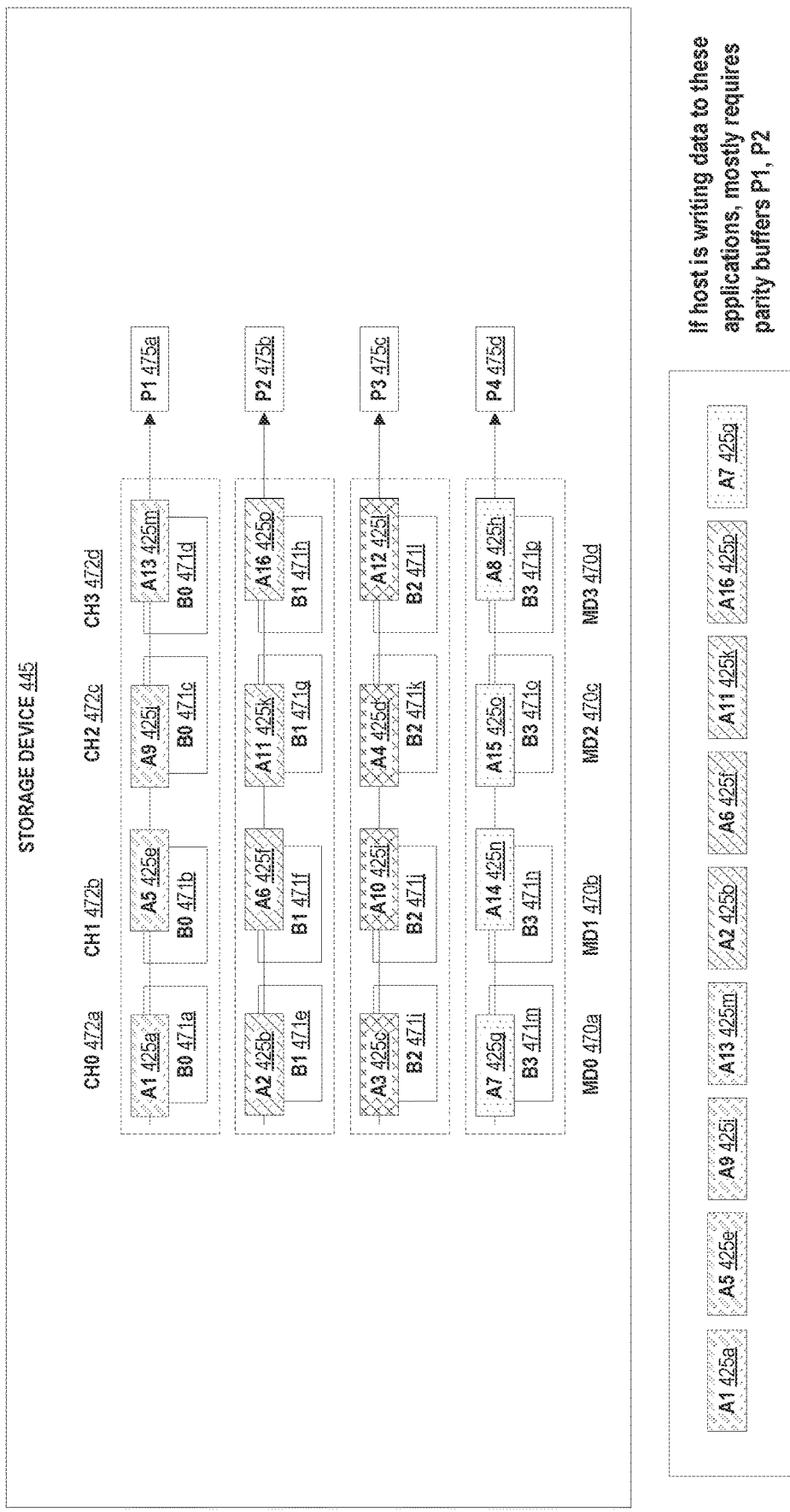
FIG. 4C is a block diagram illustrating utilization of device resources based on host assisted grouping of applications in an example data storage device, in accordance with certain embodiments.

Information relating to application groups 427 and/or application group IDs 427 can be communicated to a storage device, such as a storage device 445 shown in FIGS. 4B-4C. In some cases, the application groups 427 and/or application group IDs can be sent when requesting data operations. In other cases, the application groups 427 and/or application group IDs may be sent periodically to the storage device 445. The storage device 445 can utilize device resources based on the application groups 427 and/or application group IDs to reduce write amplification and improve performance. Since the host 410 has access to the applications 420 available or executing on the host 410, the host 410 can generally determine the application groups 427. In some embodiments, the storage device 445 may determine application groups 427. For instance, the host 410 can communicate information used to determine application groups 427 to the storage device 445. The storage device 445 may also store information relating to the application groups 427.

FIG. 4B is a block diagram 400b illustrating utilization of device resources based on host assisted grouping of applications in an example data storage device 445, in accordance with certain embodiments. In some embodiments, components of FIG. 4B can be similar to components of FIGS. 1-4A having similar names and/or reference numbers. For example, the storage device 445 can be similar to the storage device 145, 245, 345 in FIGS. 1-3B in some aspects. Certain details relating to the block diagram 400b are described above in connection with FIGS. 1-4A.

Certain details relating to FIG. 4B are described in connection with FIGS. 3A-3B and 4A. The example of FIG. 4B can be similar to the examples of FIGS. 3A-3B, but in the example of FIG. 4B, the storage device 445 can write application data 425 and utilize device resources based on application groups 427. For instance, application data 425 for applications 420 belonging to the same application group 427 can be written across multiple channels 472 in parallel and share parity data 475.

The host 410 may execute more one or more applications 420, which may request data storage operations in connection with the storage device 445. In the example of FIG. 4B, the one or more applications 420 executing on the host 410 include App1 420a, App2 420b, App3 420c, . . . AppX 420n-1, AppY 420n, etc. The applications 420 can have respective requirements, characteristics, or properties. For example, the requirements, characteristics, and/or properties can relate to latency, fragmentation, randomness of data, data rate, access rate, workload, amount of data, etc. Each application 420 can read data from or write data to the storage device 445. The host 410 can send read and write requests to the storage device 445 on behalf of the applications 420.

In connection with a write request, data of an application 420 can be cached in a DRAM 455 of the storage device 445 and written to data storage 448. For example, data for App1 420a is indicated as application data A1 425a, data for App2 420b is indicated as application data A2 425b, data for App3 420c is indicated as application data A3 425c, and so forth. Application data 425 may also be referred to as "app data." The application data 425 is stored in the DRAM 455 and written to the data storage 448. The storage device 445 may allocate a portion or section 455-1 of the DRAM 455 for caching the application data 425. The storage device 445 may also allocate a portion or section 455-2 of the DRAM 455 for caching parity data/buffers 475. The DRAM sections 455-1, 455-2 may be referred to as the DRAM buffers/caches 455-1, 455-2. In the example of FIG. 4B, the storage device 445 is an SSD device, and the data storage 448 includes NAND arrays/memory. The data storage 448 may include one or more meta dies MD 470. Each meta die MD 470 can include one or more dies, which can include one or more blocks 471. For instance, a die can be made of multiple planes, blocks, pages, etc. Various device resources can be used or generated in writing the application data 425 to the data storage 448, such as cache, DRAM, SRAM, parity buffers, etc.

For illustrative purposes, a simplified example is shown in FIG. 4B. FIG. 4B shows 16 active applications 420 that are writing data to the storage device 445, 4 meta dies (16 dies) 470, and 4 parity buffers 475. The meta dies 470 include meta dies MD0 470a, MD1 470b, MD2 470c, and MD3 470d, and the parity buffers 475 include parity buffers P1 475a, P2 475b, P3 475c, and P4 475d. Each meta die ("MD") 470 includes 4 blocks 471. For instance, meta die MD0 470a includes blocks B0 471a, B1 471e, B2 471i, and B4 471m. Meta die MD1 470b includes blocks B0 471b, B1 471f, B2 471j, and B4 471n, and so forth. Data can be written to the meta dies 470 through respective channels CH 472. For example, data can be written to meta die MD0 470a through channel CH0 472a, data can be written to meta die MD1 470b through channel CH1 472b, etc. Data can be written in parallel to the meta dies 470 using the different channels CH 472. For instance, the applications 420 and/or corresponding application data 425 are shown as belonging to different ranges, and a block or a set of blocks 471 can be allocated to the applications 420 and/or application data 425. The DRAM cache 455-2 can include an amount of memory for caching 2 parity buffers. If the DRAM cache 455-2 does not include sufficient memory for caching all the parity buffers 475 needed for generating parity data, the parity buffers 475 in the DRAM cache 455-2 may be written to the data storage 448 and reloaded to the DRAM cache 455-2 as needed. For example, the parity buffers 475 may be evicted from the DRAM cache 455-2 and dumped to the data storage 448. In some embodiments, the parity data may be written to an SLC, for example, for faster access and for preventing corruption of parity data. The example of FIG. 4B is provided for illustrative purposes and simplicity, and in general, the number of dies, blocks, and/or parity buffers will be much higher.

In the example of FIG. 4B, device resources, such as cache, DRAM, SRAM, parity buffers, etc. can be shared among applications 420 belonging to the same application group 427. For instance, the application groups 427 can be as determined in FIG. 4A. A first application group 427a having App Group ID 1 includes App1 420a, App5 420e, App9 420i, and App13 420m. A second application group 427b having App Group ID 2 includes App2 420b, App6 420f, App11 420k, and App16 420p. A third application group 427c having App Group ID 3 includes App3 420c, App10 420j, App4 420d, and App12 420l. A fourth application group 427d having App Group ID 4 includes App7 420g, App14 420n, App15 420o, and App8 420h. Similar to FIG. 4A, application data 425 for applications 420 that belong to the same application group 427 are indicated in the same pattern.

Application data 425 belonging to applications 420 in the same application group 427 can be written across different channels 472 for parallelism. Accordingly, application data A1 425a, A5 425e, A9 425j and A413m for applications App1 420a, App5 420e, App9 420j, and App13 420m can be put across different channels CH0-CH3 472a-d and share parity buffer P1 475a. Similarly, application data A2 425b, A6 425f, A11 425k, and A16 425p for applications App2 420b, App6 420f, App11 420k, and App16 420p can be put across channels CH0-CH3 472a-d and share parity buffer P2 475b. Application data A3 425c, A10 425j, A4 425d, and A12 425l for applications App3 420c, App10 420j, App4 420d, and App12 420l can be put across channels CH0-CH3 472a-d and share parity buffer P3 475c. Application data A7 425g, A14 425n, A15 425o, and A8 425h for applications App7 420g, App14 420n, App15 420o, and App8 420h can be put across channels CH0-CH3 472a-d and share parity buffer P4 475d.

Applications 420 in the same application group 427 can have a high correlation or similarity based on one or more requirements, characteristics, properties associated with the applications 420. For example, applications 420 in the same application group 427 can satisfy a threshold or selected level of correlation or similarity. Correlation or similarity between different applications 420 can be determined based on various techniques or methods as appropriate. Applications 420 in an application group 427 can be similar in terms of one or more of latency requirements, fragmentation or randomness of data, data rates, access rates, workload or amount of data, etc. Applications 420 in an application group 427 may be accessed at different times, but may have similar patterns relating to usage and data. For example, an application 420 writing a movie file and an application 420 writing random amounts of data frequently would not be placed in the same application group 427. Sharing device resources among applications 420 in an application group 427 therefore can increase efficiency, reduce latency, reduce write amplification, improve performance, etc.

In some embodiments, the storage device 445 can receive and store application group 427 information from the host 410. For example, the application group 427 information may be stored or cached as needed in the data storage 448, the DRAM 455, SRAM, etc. In some cases, the application group 472 information may include characteristics associated with each application group 472, such as properties associated with the applications 420 in the application group 472, application group 472 IDs, etc. In certain embodiments, the storage device 445 may also store mapping information associated with the application group 427 information and the data storage 448. The application group 427 information can indicate priority of different application groups 427. For instance, the application group ID itself may indicate priority. Requests may be processed based on priority, and device resources can be utilized or allocated based on priority. As an example, a lower application group ID can indicate higher priority. Requests associated with application group 427 having a higher priority can be processed prior to requests associated with application group 427 having a lower priority. For example, parity buffers 475 for application group 427 having a higher priority can be kept in the DRAM cache 445-2 over parity buffers 475 for application group 427 having a lower priority. If an application 420 is currently not associated with an application group 427, but is associated with an application group 427 at a later time, the storage device 445 may move or shuffle data associated with the application 420 at that time based on the application group 427.

As described above, the DRAM cache 455-2 has sufficient memory to include 2 parity buffers. Supposing applications 420 in the first application group 427 and the second application group 427 are accessed most frequently, the parity buffers P1 475a and P2 475b can remain in the DRAM cache 455-2. The parity buffers P3 475c and P4 475d are not accessed as frequently and may be loaded to a temporary section in the DRAM 455 or another cache. By maintaining the more frequently used parity buffers 475 in the DRAM cache 455-2, loading and thrashing of the parity buffers 475 can be reduced and thereby reduce write amplification and improve performance. In this way, cache management and parity data management can be more efficient. In addition, applications 420 in the same application group 427 can have similar data rates and share a parity buffer, and parity data can be generated more quickly and efficiently. For instance, write pointers may be in a similar offset area. Since data rates are similar, an application 420 with a slower data rate would not delay another application 420 with a faster data rate. When generation of parity data is completed, the parity data can be written to the data storage 448.

The applications 420 in the same application group 427 can also be similar in terms of latency, and putting application data 425 of these applications 420 across the different channels 472 can also reduce latency, for example, when writing data. In some cases, if the applications 420 in the first application group 427 have low latency requirements (e.g., a shorter response time), write requests for these applications 420 can be prioritized over write requests for applications 420 having higher latency requirements (e.g., a longer response time) such that the parity buffer 475 for the first application group 427 is not evicted from the DRAM cache 445-2. This can also result in less loading and thrashing of parity data. Similarly, applications 420 in the same application group 427 can be similar with respect to fragmentation, randomness, amount of data, etc. which can also lead to less loading and thrashing of parity data. Accordingly, sharing parity buffers 475 among applications 420 that belong to the same application group 427 can provide various advantages, such as reducing write amplification, reducing latency, improving cache management, improving performance, etc. Since in most cases, the number of active applications, dies, blocks, and/or parity buffers can be much higher, the impact and advantages of sharing devices resources among applications 420 that belong to the same application group 427 can be much greater.

FIG. 4C is a block diagram 400c illustrating utilization of device resources based on host assisted grouping of applications in an example storage device 445, in accordance with certain embodiments. In some embodiments, components of FIG. 4C can be similar to components of FIGS. 1-4B having similar names and/or reference numbers. For example, the storage device 445 can be similar to the storage device 145, 245, 345, 445 in FIGS. 1-2, 3A-3B, 4A-4B in some aspects. Certain details relating to the block diagram 400c are described above in connection with FIGS. 1-4B.

FIG. 4C further illustrates the example of FIG. 4B for writing application data 425 for certain applications 420. In the example of FIG. 4C, the host 410 is sending write requests for applications App1 420a, App5 420e, App9 420i, App13 420m, App2 420b, App6 420f, App11 420k, App16 420p, and App7 420g. App1 320a, App5 320e, App9 320i, and App13 320m belong to App Group ID 1 427. App2 320b, App6 320f, App11 320k, and App16 320p belong to App Group ID 2 427. App7 420g belongs to App Group ID 3. If applications 420 in App Group ID 1 427 and App Group ID 2 427 are accessed most frequently, the parity buffers P1 475a and P2 475b are required for generating parity data most of the time and can remain in the DRAM cache 455-2. The parity buffer P4 475d for App7 420g may not be accessed as frequently and may be loaded to a temporary section in the DRAM 455 or another cache such that the parity buffers P1 475a and P2 475b can be cached in the DRAM cache 455-2. Accordingly, the parity buffers 475 are not swapped as frequently. By maintaining the more frequently used parity buffers 475 in the DRAM cache 455-2, loading and thrashing of the parity buffers 475 can be reduced and thereby reduce write amplification and improve performance.

In some cases, not all applications 420 in the same application group 427 can share a parity buffer, for example, due to various reasons, such as underlying physical properties, recovery time considerations, etc. In such cases, the storage 445 can still utilize application groups 427 for loading and thrashing parity data from the DRAM cache 455-2 for efficient cache management. For instance, the storage device 445 can keep parity buffers 475 for more frequently used applications 420 in the DRAM cache 455-2. Also, the examples of FIGS. 4A-4C have explained in connection with write requests, but sharing parity buffers 475 among applications 420 belonging to the same application group 427 can also apply to read requests. For example, if there is an error in reading data for a particular application 420, corresponding parity data can be used to recover the data for the application 420, and the parity data would be loaded and thrashed based on application groups 427.

For illustrative purposes, the examples in FIGS. 4A-4C have been explained in connection with parity buffers and DRAM. However, device resource utilization based on host assisted grouping of applications can also apply to other types of data and/or resources. In some embodiments, parity buffers can be cached in SRAM instead of DRAM or in any other type of cache. For instance, if DRAM does not have sufficient memory, SRAM could be used to cache the parity buffers. Similar techniques as described above can be used to load and thrash parity buffers in the SRAM based on application groups. In certain embodiments, control data and/or L2P caching can be done based on application groups, for example, in SRAM. In other embodiments, application data caching may also be done based on application groups. Accordingly, various device resources can be generated or used based on application groups. In this manner, a storage system for providing utilization of device resources based on host assisted grouping of applications can provide efficient cache management, reduce latency, reduce write amplification, and improve performance. The storage system for providing utilization of device resources based on host assisted grouping of applications can help hosts utilize full bandwidth and minimize latencies for various applications.

FIG. 5 illustrates a workflow process 500 for utilization of device resources based on host assisted grouping of applications in a data storage device, in accordance with one or more embodiments. For example, the workflow process 500 may be performed by a controller of a storage system or a storage device, such as a storage system 140 or a storage device 145 in FIG. 1, a storage device 245 in FIG. 2, or a storage device 445 in FIGS. 4A-4C. For illustrative purposes, the process 500 is explained below in connection with the storage device 445 in FIGS. 4A-C. Certain details relating to the process 500 are explained in more detail with respect to FIGS. 1-4C. Depending on the embodiment, the process 500 may include fewer or additional blocks, and the blocks may be performed in an order that is different from illustrated.

At block 505, the storage device 445 can receive application group 427 information associated with applications from a host 410, wherein the application group 427 information indicates corresponding application groups 427 for the applications on the host. In some embodiments, the application groups 427 are determined by the host 410 based on requirements, characteristics, or properties associated with the applications 420. Each application group 427 may be associated with an application group identifier (ID). In certain embodiments, the requirements, characteristics, or properties associated with the applications 420 include one or more of: latency, fragmentation, randomness, data rate, access rate, workload, or amount of data. In some embodiments, the plurality of applications 420 satisfies a selected level of similarity or correlation based on the requirements, characteristics, or properties associated with the plurality of applications 420.

At block 510, the storage device 445 can receive a plurality of write requests associated with a plurality of applications 420 from the host 410, wherein the plurality of applications 420 is included in the same application group 427.

At block 515, the storage device 445 can write data for each write request of the plurality of write requests in parallel across a plurality of channels 472 associated with a plurality of dies 470 in the non-volatile memory 448 such that the data for the plurality of write requests share a parity buffer 475. In some embodiments, the parity buffer 475 is cached in in the volatile memory 455 (e.g., DRAM) for generating the parity data. The volatile memory may include one or more of: dynamic random-access memory (DRAM) or static random-access memory (SRAM). In certain embodiments, the storage device 445 is further configured to load or thrash parity buffers 475 to and from a cache 455-2 in the volatile memory 455 based on the application groups 472 of the applications 420. In some embodiments, a parity buffer 475 for an application group 472 that is more frequently accessed remains in the cache 455-2 in the volatile memory 455 over a parity buffer 475 for an application group 420 that is less frequently accessed. In some cases, the application group 427 information may be stored in the non-volatile memory 448 or the volatile memory 455. An application group 427 for an application 420 may be included in a write request. In certain embodiments, the storage device 445 is further configured to move or shuffle at least a portion of data of an application on the non-volatile memory 448 based on an application group 427 for the application.

At block 520, the storage device 445 can generate parity data for the data for the plurality of write requests.

Figure 6:
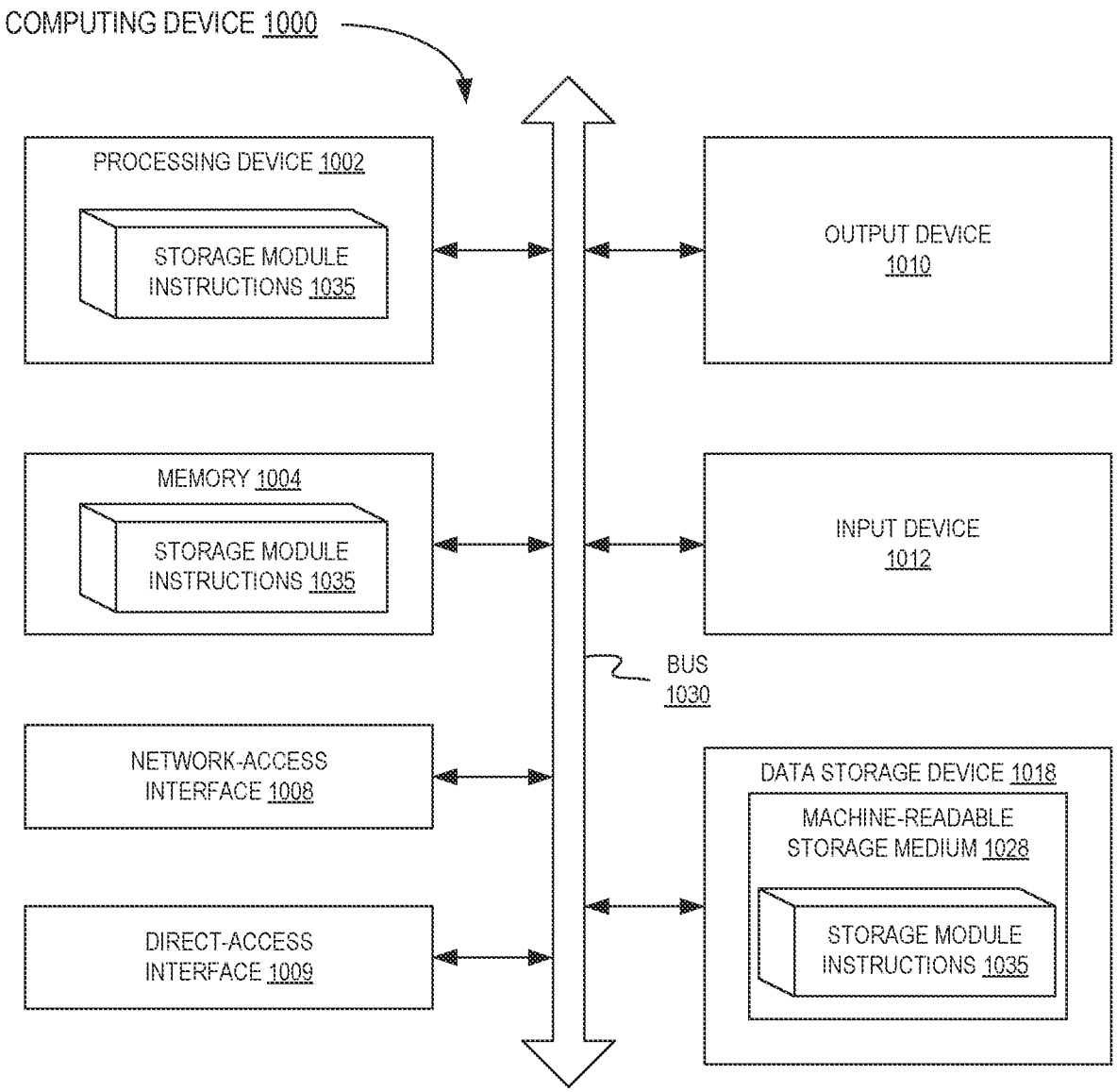
FIG. 6 is a diagram of a computing device, in accordance with one or more embodiments.

FIG. 6 is a diagram of a computing device 1000, in accordance with one or more embodiments. The computing device 1000 may execute instructions that may cause the computing device 1000 to perform any one or more of the methodologies (e.g., operations, methods, functions, etc.) discussed herein. The computing device 1000 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the functions, operations, methods, algorithms, etc., discussed herein.

The example computing device 1000 includes a processing device (e.g., a processor, a controller, a central processing unit (CPU), etc.) 1002, a main memory 1004 (e.g., read-only memory (ROM), flash memory, dynamic random-access memory (DRAM) such as synchronous DRAM (SDRAM)), a network-access interface 1008, a direct-access interface 1009, an output device 1010, an input device 1012, and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute storage module instructions 1035 for performing the operations and steps discussed herein.

The computing device 1000 may include a network-access interface 1008 (e.g., a network interface card, a Wi-Fi interface, etc.) which may communicate with a network (e.g., network 120 illustrated in FIG. 1). The computing device may also include a direct-access interface 1009 (e.g., a USB interface, an external Serial Advanced Technology Attachment (eSATA) interface, a Thunderbolt interface, etc.). The computing device 1000 also may include an output device 1010 (e.g., a liquid crystal display (LCD) or a cathode ray tube (CRT)), and an input device 1012 (e.g., a mouse, a keyboard, etc.). In one embodiment, the output device 1010 and the input device 1012 may be combined into a single component or device (e.g., an LCD touch screen).

The data storage device 1018 may include a computer-readable storage medium 1028 on which is stored one or more sets of instructions (e.g., storage module instructions 1035) embodying any one or more of the methodologies or functions described herein. The storage module instructions 1035 may also reside, completely or at least partially, within the main memory 1004 and/or within the processing device 1002 during execution thereof by the computing device 1000. The main memory 1004 and the processing device 1002 may also constitute computer-readable media. The instructions may further be transmitted or received over via the network-access interface 1008 and/or direct-access interface 1009.

While the computer-readable storage medium 1028 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

General Comments

Those skilled in the art will appreciate that in some embodiments, other types of data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

Methods and processes described herein may be embodied in, and partially or fully automated via, software code modules executed by one or more general and/or special purpose computers/processors. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). The software instructions may be stored on any type of computer-readable medium (e.g., a non-transitory computer-readable medium) or other computer storage device or collection of storage devices. "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. A data storage device comprising:
    a non-volatile memory;
    a volatile memory; and
    a controller configured to:
        receive application group information associated with applications from a host, wherein the application group information indicates corresponding application groups for the applications on the host;
        receive a plurality of write requests associated with a plurality of applications from the host, wherein the plurality of applications is included in the same application group;
        write data for each write request of the plurality of write requests in parallel across a plurality of channels associated with a plurality of dies in the non-volatile memory such that the data for the plurality of write requests share a parity buffer; and
        generate parity data for the data for the plurality of write requests.

2. The data storage device of claim 1, wherein the application groups are determined by the host based on requirements, characteristics, or properties associated with the applications.

3. The data storage device of claim 2, wherein the requirements, characteristics, or properties associated with the applications include one or more of: latency, fragmentation, randomness, data rate, access rate, workload, or amount of data.

4. The data storage device of claim 2, wherein the plurality of applications satisfies a selected level of similarity or correlation based on the requirements, characteristics, or properties associated with the plurality of applications.

5. The data storage device of claim 1, wherein each application group is associated with an application group identifier (ID).

6. The data storage device of claim 1, wherein the parity buffer is cached in in the volatile memory for generating the parity data.

7. The data storage device of claim 1, wherein the volatile memory includes one or more of: dynamic random-access memory (DRAM) or static random-access memory (SRAM).

8. The data storage device of claim 1, wherein the controller is further configured to load or thrash parity buffers to and from a cache in the volatile memory based on the application groups of the applications.

9. The data storage device of claim 8, wherein a parity buffer for an application group that is more frequently accessed remains in the cache in the volatile memory over a parity buffer for an application group that is less frequently accessed.

10. The data storage device of claim 1, wherein the application group information is stored in the non-volatile memory or the volatile memory.

11. The data storage device of claim 1, wherein an application group for an application is included in a write request.

12. The data storage device of claim 1, wherein the controller is further configured to move or shuffle at least a portion of data of an application on the non-volatile memory based on an application group for the application.

13. A method of processing data requests in a data storage device, the method comprising:
    receiving application group information associated with applications from a host, wherein the application group information indicates corresponding application groups for the applications on the host;
    receiving a plurality of write requests associated with a plurality of applications from the host, wherein the plurality of applications is included in the same application group;
    writing data for each write request of the plurality of write requests in parallel across a plurality of channels associated with a plurality of dies in a non-volatile memory such that the data for the plurality of write requests share a parity buffer; and
    generating parity data for the data for the plurality of write requests.

14. The method of claim 13, wherein the application groups are determined by the host based on requirements, characteristics, or properties associated with the applications.

15. The method of claim 14, wherein the requirements, characteristics, or properties associated with the applications include one or more of: latency, fragmentation, randomness, data rate, access rate, workload, or amount of data.

16. The method of claim 14, wherein the plurality of applications satisfies a selected level of similarity or correlation based on the requirements, characteristics, or properties associated with the plurality of applications.

17. The method of claim 13, wherein the parity buffer is cached in in a volatile memory of the data storage device for generating the parity data.

18. The method of claim 13, further comprising loading or thrashing parity buffers to and from a cache in a volatile memory of the data storage device based on the application groups of the applications.

19. The method of claim 18, wherein a parity buffer for an application group that is more frequently accessed remains in the cache in the volatile memory over a parity buffer for an application group that is less frequently accessed.

20. A data storage device comprising:
- a non-volatile memory;
- a volatile memory; and
- controller means configured to:
    - receive application group information associated with applications from a host, wherein the application group information indicates corresponding application groups for the applications on the host;
    - receive a plurality of write requests associated with a plurality of applications from the host, wherein the plurality of applications is included in the same application group;
    - write data for each write request of the plurality of write requests in parallel across a plurality of channels associated with a plurality of dies in the non-volatile memory such that the data for the plurality of write requests share a parity buffer; and
    - generate parity data for the data for the plurality of write requests.

* * * * *